A. F. HALL & G. CUTHBERT.
FLUID CLUTCH.
APPLICATION FILED APR. 18, 1910.

996,925.

Patented July 4, 1911.

3 SHEETS—SHEET 3.

UNITED STATES PATENT OFFICE.

AUGUSTINE F. HALL AND GEORGE CUTHBERT, OF PHILADELPHIA, PENNSYLVANIA.

FLUID-CLUTCH.

996,925.          Specification of Letters Patent.          Patented July 4, 1911.

Application filed April 18, 1910. Serial No. 556,010.

*To all whom it may concern:*

Be it known that we, AUGUSTINE F. HALL and GEORGE CUTHBERT, citizens of the United States, residing at Philadelphia, in the county of Philadelphia and State of Pennsylvania, have invented certain new and useful Improvements in Fluid-Clutches, of which the following is a specification.

This invention relates to improvements in fluid clutches and embraces the construction of a device having a plurality of pistons operating in independent fluid chambers to maintain a supply of oil under pressure, and a plurality of valves controlling the passage of the oil in the chambers.

One of the objects of the invention is the construction of a fluid or hydraulic clutch having a plurality of pistons connected with a common crank shaft and controlling the operation of the crank shaft by means of a suitable pressure fluid arranged in the piston casings and in the crank shaft casings, the movement of which is regulated by a plurality of valves.

Another object of the invention is the construction of a fluid or hydraulic clutch embracing means for maintaining a supply of oil or other fluid under pressure and means whereby the speed of a crank shaft connected with said means may be regulated by regulating the flow of the pressure fluid.

Another object of the invention is the construction of a fluid clutch embodying a fluid chamber, a crank shaft operating therein, a plurality of pistons connected to the crank shaft, means for regulating the flow of fluid in the chamber and against the pistons, and means adapted to allow for the expansion of the oil caused by heating.

Figure 1:
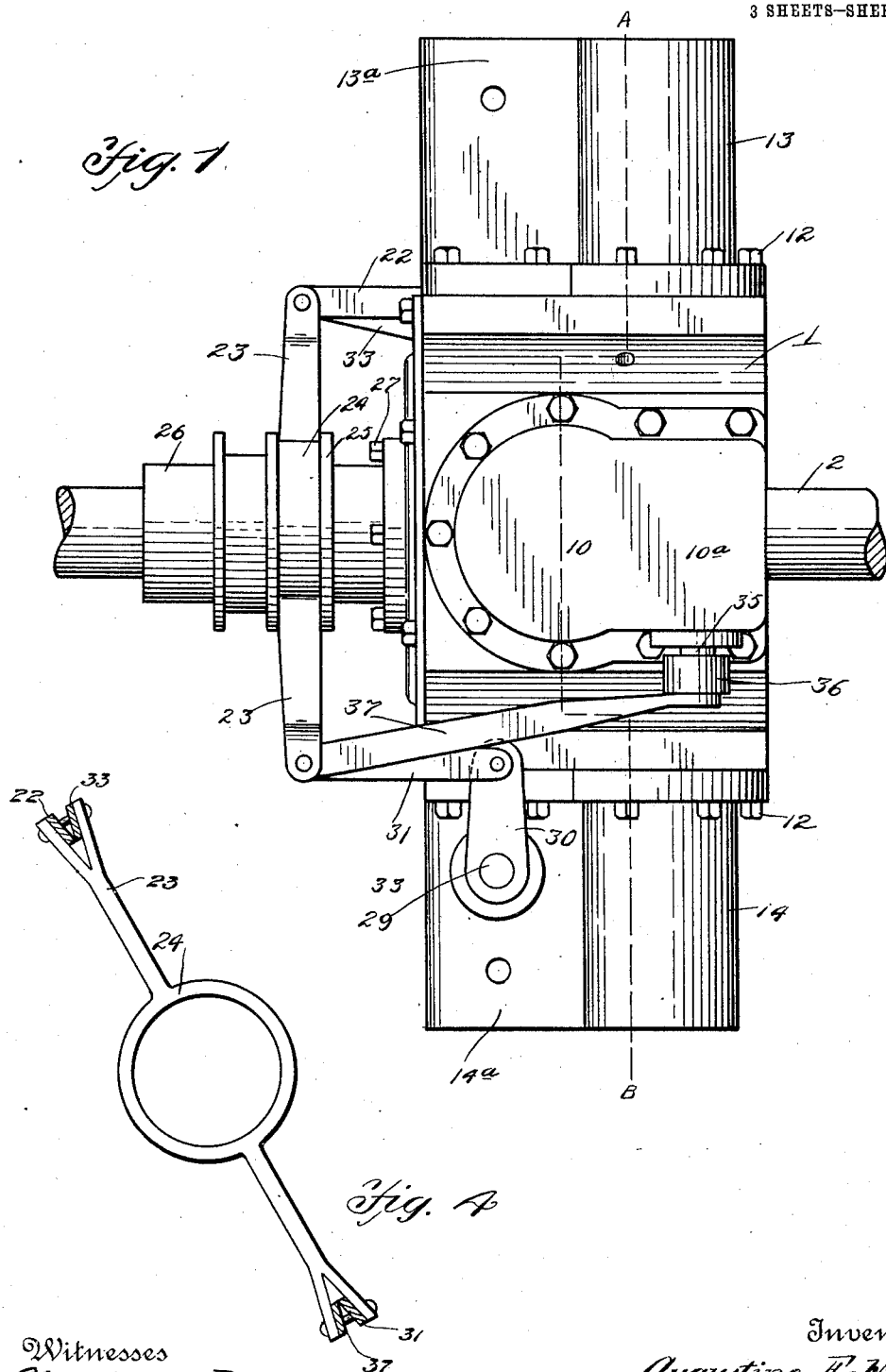
Figure 2:
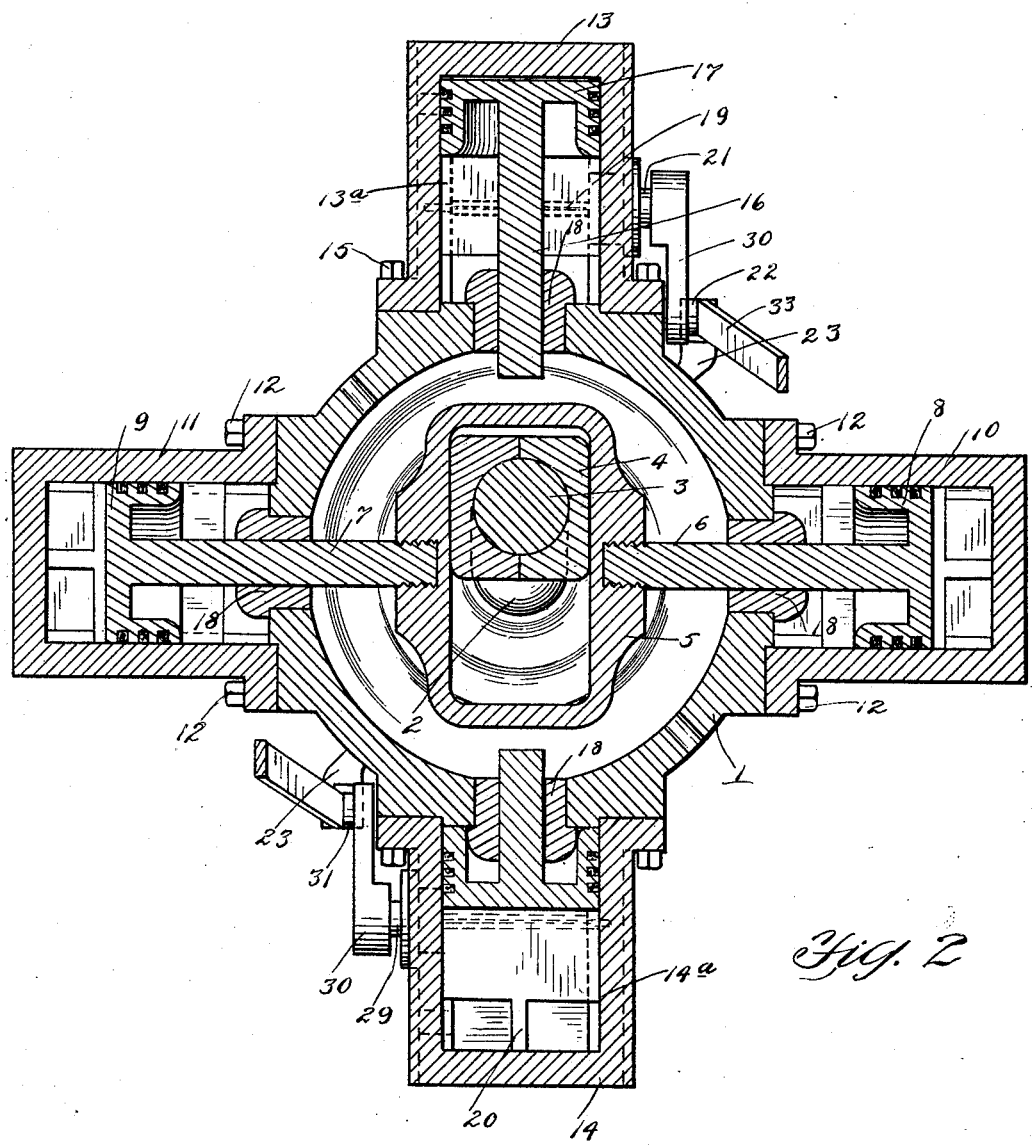
Figure 3:
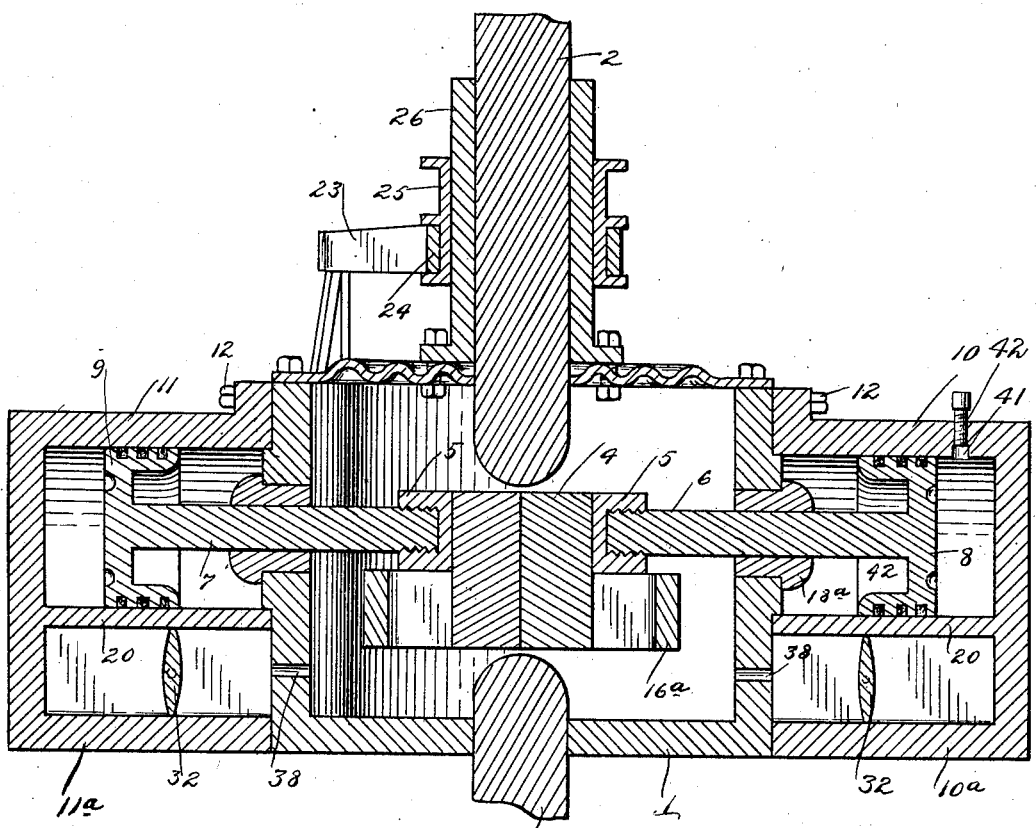
Figure 5:
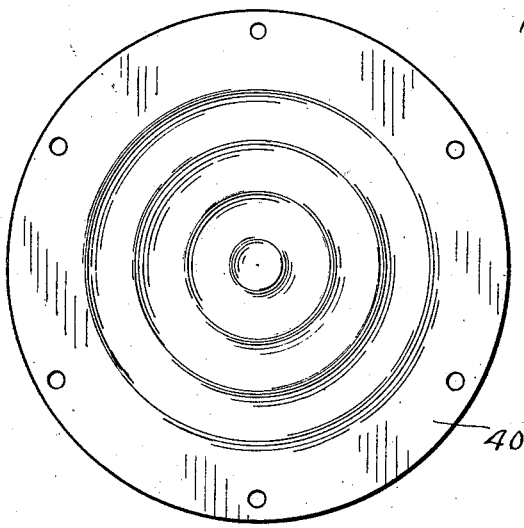

With the above and other objects in view the invention comprises certain combinations, constructions and arrangements of parts, clearly described in the following specification and clearly illustrated in the accompanying drawings forming a part of the specification and wherein, Figure 1 is a side elevation of the improved clutch, Fig. 2 is a sectional view taken on line A—B of Fig. 1, Fig. 3 is a central transverse sectional view, Fig. 4 is a detail elevation of an operating collar, and Fig. 5 is a plan view of an expansible diaphragm for the crank casing.

Referring to the accompanying drawings illustrating the invention 1 denotes crank casing, which contains the crank shaft 2. The crank offset 3 of the shaft 2 is connected with the slide 4, which works on the guide frame 5, which slide is adapted to be rotated in the casing 1. The guide frame 5 is connected to the piston rods 6 and 7, which rods are provided with pistons 8 and 9, which pistons operate in the piston chambers or cylinders 10 and 11. The cylinders or chambers 10 and 11 are suitably bolted to the casing 1 by the bolts 12.

At right angles to the cylinders 10 and 11 the cylinders 13 and 14 are mounted on the casing 1, by means of the bolts 15. The cylinders 13 and 14 are slightly offset relative to the cylinders 10 and 11 so as to allow for the proper movement of the piston rods which work in said cylinders 13 and 14. A piston rod 16 works in the cylinder 13, and is connected to a guide 16$^a$ similar to the guide 5, which is acted on by the slide on the crank offset 3. The piston rod 16 carries a piston 17 which reciprocates with the rod 16 in the cylinder 13. A like piston rod and piston operates in the cylinder 14 and is connected to the same guide as the piston rod 16, this latter piston not being shown in the drawings in order to disclose the construction of the cylinder in which it works, which is formed like the other cylinders. The piston rods work through bushings 18 mounted between the cylinders for the pistons and the crank casing 1.

Each of the piston cylinders is formed with an offset cylinder for the valve which controls the movement of pressure fluid near said cylinder. In the cylinder offset 13$^a$ of the cylinder 10 the valve 19 is mounted for operation between the bridge 20 of said cylinder offset and the adjacent wall thereof. The valve 19 is secured to the cranked shaft 21, which is connected to the operating pitman 22, which pitman connects with the operating rod 23, which is provided with a collar 24 mounted slidably on the sleeve 25 which is carried by the bearing 26, secured by the bolts 27 to the casing 1.

In the cylinder offset 14$^a$ a valve 28 operates, this valve being secured to the shaft 29 which carries a crank arm 30, which arm is connected to the pitman, pivoted to the end of the operating arm or member 23. In the cylinder offset 11$^a$ a valve 32 works, this valve shaft connected to an operating crank shaft which is connected by the pitman 33 with the operating arm 23.

In the cylinder offset 10$^a$ the valve 34 is positioned, being secured in place by the shaft 35 which is provided with a crank arm 36, connected with the pitman 37, which is pivoted to the operating rod 23. By sliding the sleeve 25 on the bearing 26, by a suitable spanner rod, the various valves can be rocked in the valve chambers simultaneously. The valves are located in the valve chambers midway of the ends thereof and control the movement of the pressure fluid, which is preferably a heavy oil, soft soap or other liquid, from the piston cylinders to the valve cylinder offsets, which offsets are in communication with the piston cylinders, and with the casing 1 of the crank shaft 2. Communication between the casing 1 and the valve cylinder offsets is effected by the ports 38.

One end of the casing 1 is closed by the diaphragm or corrugated metal plate or disk 40, which is adapted to expand under the influence of heat generated within the casing and the cylinders.

When the crank shaft 2 is rotated the slide 4 will be oscillated on the guide 5, thereby oscillating the slide in a circular orbit within the casing 1. The oscillation of the guides engaging the slide of the crank offset 3 will reciprocate the pistons in their respective cylinders and maintain the pressure fluid, which fills the cylinders of the pistons, the cylinder offsets of the valves and the crank casing 1, under pressure. When the valves are opened the pressure fluid will flow through the cylinders of the pistons into the cylinder offsets and into the crank casing 1. Should the valves be partly closed the resistance to the movement of the pressure fluid will be increased, thereby reducing the speed and power of the crank shaft 2. The larger part of the movement of the pressure fluid is in the cylinders of the pistons and the offsets thereof for the valves. The connection of ports between the casing 1 and the cylinders and offsets being provided to allow for the displacement due to the areas occupied by the pistons, this being necessary owing to the incompressibility of fluid. The casing 1 and the cylinders are provided with suitable openings 41, which are closed by removable plugs 42, whereby the oil may be removed from or added to the device. These plugs are made of proper length so that the area for the movement of the pressure fluid can be increased or decreased, and the pressure thereby varied. The heads of the pistons are provided with recesses 43 adapted to be engaged by a spanner wrench, whereby the pistons can be removed.

The cylinders are provided with openings arranged on the top thereof, through which a suitable pipe of smaller diameter than the openings is inserted, whereby the casing 1 and the cylinders can be filled in such a manner as to displace practically all of the air in the cylinders and casing. The pistons are provided with sockets 42', which receive the heads 18ᵃ of the bushings 18, whereby all the fluid between the pistons and the portions of the casing 1 near the bushings will be acted on and removed.

Having described our invention we claim:—

1. In a fluid clutch, a crank casing, a crank shaft working therein, pressure pistons connected with the crank shaft, valve cylinders, piston cylinders for the pistons in communication with the valve cylinders, valves in the valve cylinders controlling the movement of fluid between the two cylinders, means for operating the valves in unison, and a diaphragm plate on the crank casing adapted to expand under the influence of heat generated therein.

2. In a fluid clutch, a crank casing, a plurality of cylinders connected thereto a plurality of pistons working in the cylinders, a plurality of valve cylinders communicating with the piston cylinders, valves in the valve cylinders controlling the movement of fluid between the two sets of cylinders, and a metal diaphragm secured on the crank casing adapted to expand under the influence of heat generated in the casing and in the cylinders.

3. In a fluid clutch, a crank casing, a crank shaft working therein, a plurality of pistons connected to the crank casing, a plurality of cylinders for the pistons, valve cylinders in communication with the piston cylinders, valves in the valve cylinders controlling the movement of fluid between the cylinders of the pistons and the cylinders of the valves, means for opening the valves in unison, ports connecting the valve cylinders and the crank casing and a metal diaphragm on the crank casing adapted to expand under the influence of heat.

4. A fluid clutch having means for maintaining fluid normally under pressure and an expansible diaphragm adapted to compensate for the expansion of the fluid when heated.

5. A fluid clutch having means for placing a fluid under pressure and a diaphragm adapted to expand when the fluid is heated.

6. A fluid clutch comprising a crank casing, a plurality of cylinders connected thereto, pistons in said cylinders, means for maintaining fluid under pressure in said casing and cylinders and a diaphragm for said casing.

In testimony whereof we affix our signatures in presence of two witnesses.

AUGUSTINE F. HALL.
GEORGE CUTHBERT.

Witnesses:
JOHN D. RICHARDSON,
FRANCIS J. FEE.